(12) United States Patent
Jeong et al.

(10) Patent No.: US 7,648,688 B2
(45) Date of Patent: Jan. 19, 2010

(54) METHOD OF SEPARATING CARBON DIOXIDE FROM GAS MIXTURE USING BIOPOLYMER

(75) Inventors: Soon-Kwan Jeong, Daejeon (KR); Seung-Woo Lee, Daejeon (KR); Si-Hyun Lee, Daejeon (KR); Cheong-Song Choi, Gyunggi-Do (KR); Sang-Do Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 12/194,194

(22) Filed: Aug. 19, 2008

(65) Prior Publication Data

US 2009/0269268 A1    Oct. 29, 2009

(30) Foreign Application Priority Data

Apr. 29, 2008  (KR) .................... 10-2008-0039907

(51) Int. Cl.
     *B01D 53/86*  (2006.01)
(52) U.S. Cl. ...................... 423/219; 423/225
(58) Field of Classification Search ............... 423/430, 423/210, 220, 230, 219, 225; 95/36, 291
     See application file for complete search history.

(56) References Cited

U.S. PATENT DOCUMENTS

| | | | |
|---|---|---|---|
| 6,524,843 B1 * | 2/2003 | Blais et al. | 435/266 |
| 7,132,090 B2 * | 11/2006 | Dziedzic et al. | 423/230 |
| 2006/0048517 A1 * | 3/2006 | Fradette et al. | 60/772 |

OTHER PUBLICATIONS

Pietrzak et al., Constituents of Unionid Extrapallial Fluid. II Ph and Metal Ion Composition, Dec. 3, 1974, Hydrobiologia vol. 50, 1, p. 89-93.*
Lee, Seung Woo, et al., "High-Rate Growth of Calcium Carbonate Crystal Using Soluble Protein from Diseased Oyster Shell," Crystal Growth & Design, 2007, vol. 7, No. 8, pp. 1463-1468.

* cited by examiner

*Primary Examiner*—Edward M Johnson
(74) *Attorney, Agent, or Firm*—Arent Fox LLP

(57) ABSTRACT

Disclosed herein is a method of separating carbon dioxide from a gas mixture using a biopolymer, including: introducing hemocyte or extrapallial fluid, extracted from shells, into a reactor filled with 1 L of a solution containing a calcium source, and then dissolving the hemocyte or extrapallial fluid in the solution to form a mixed solution; and mixing carbon dioxide or a gas mixture containing carbon dioxide into the mixed solution to separate carbon dioxide from the gas mixture.

8 Claims, 4 Drawing Sheets

METHOD OF SEPARATING CARBON DIOXIDE FROM GAS MIXTURE USING BIOPOLYMER

BACKGROUND OF THE INVENTION

1. Field of the Invention

The present invention relates to a method of separating carbon dioxide from a gas mixture, and, more particularly, to a method of separating carbon dioxide from a gas mixture using hemocyte or extrapallial fluid, which is known to be a biopolymer synthesizing calcium carbonate in sea water.

2. Description of the Related Art

A bivalve shell is mainly composed of calcium carbonate (95 wt %), and bivalves synthesize calcium carbonate using carbon dioxide and calcium ions present in sea water. Among organic polymers participating in such a shell synthesis process, carbonic anhydrase is well known. Carbonic anhydrase mainly functions to convert carbon dioxide present in sea water into bicarbonate ions ($HCO_3^-$), and these bicarbonate ions are used to synthesize calcium carbonate.

The process of hydrating carbon dioxide using carbonic anhydrase is as follows.

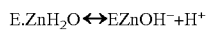

$E.ZnH_2O \leftrightarrow EZnOH^- + H^+$

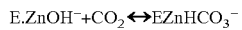

$E.ZnOH^- + CO_2 \leftrightarrow EZnHCO_3^-$

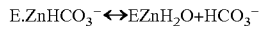

$E.ZnHCO_3^- \leftrightarrow EZnH_2O + HCO_3^-$

In the process, zinc (Zn), which is located in the carbonic anhydrase, reacts with a water molecule, thus forming a hydroxy ion, which then reacts with carbon dioxide, thus producing a bicarbonate ion.

As a well-known method of treating carbon dioxide from a gas mixture, there is a wet process of treating carbon dioxide from a gas mixture using an aqueous amine solution as an absorbing solution (refer to Korean Patent Application No. 10-2006-0017946).

However, the wet process is problematic in that, when the aqueous amine solution is used, apparatuses are easily corroded, an absorbent is deteriorated, and a large amount of regeneration heat is required, thus increasing process costs.

As conventional technologies of treating carbon dioxide using a biopolymer as an absorbent, U.S. Pat. No. 6,524,843 discloses a method of separating and removing carbon dioxide from a gas mixture by converting carbon dioxide into bicarbonate ions using a countercurrent bioreactor charged with carbonic anhydrase, in which a gas mixture including carbon dioxide is introduced into the bottom of the bioreactor and a liquid solvent (water) is introduced into the top of the bioreactor, and U.S. Pat. No. 7,132,090, which was granted to General Motors Corporation, discloses a process for converting carbon dioxide into calcium carbonate, in which carbon dioxide, discharged from factories or power plants, is primarily mixed in water and then passes through a porous membrane containing carbonic anhydrase, so that the carbon dioxide is converted into bicarbonate ions, and the bicarbonate ions are converted into calcium carbonate. However, Korean Patents relating to the above technologies have not been filed yet.

Meanwhile, carbonic anhydrase includes zinc (Zn) ions, which act as active sites for adsorbing carbon dioxide.

However, the carbonic anhydrase cannot be easily reproduced due to the presence of the zinc (Zn), and is an expensive enzyme protein, having a market price of several hundreds of thousands of Won for several milligrams, which impedes the use of carbonic anhydrase in large quantities.

SUMMARY OF THE INVENTION

Accordingly, the present invention has been made keeping in mind the above problems occurring in the prior art, and an object of the present invention is to provide a method of separating carbon dioxide from a gas mixture using hemocyte or extrapallial fluid, which is very effective in the formation of shells composed of calcium carbonate, by which carbon dioxide can be efficiently removed or treated and enzymes can be easily extracted, refined and reproduced, and in which process costs are relatively low, compared to conventional carbon dioxide treatment methods using carbonic anhydrase.

In order to accomplish the above object, the present invention provides a method of separating carbon dioxide from a gas mixture using a biopolymer, including: introducing hemocyte or extrapallial fluid, extracted from shells, into a reactor filled with 1 L of a solution containing a calcium source, and then dissolving the hemocyte or extrapallial fluid in the solution to form a mixed solution; and mixing carbon dioxide or a gas mixture containing carbon dioxide into the mixed solution to separate carbon dioxide from the gas mixture.

In the method, the calcium source is one selected from among calcium ions extracted from blast-furnace slag or steel-making slag, including a large amount of calcium oxide (CaO), and calcium ions obtained using calcium chloride ($CaCl_2$).

The reactor, into which the biopolymer is introduced, is one selected from among a wet reactor charged with filling materials, a separation membrane reactor and a gas-liquid contact membrane reactor, and the biopolymer is used in a state in which it is supported on the filling materials or separation membrane.

The temperature in the reactor is maintained at a temperature of 30° C.~50° C.

The hemocyte is introduced into the reactor in an amount of 0.01~1 g by dry weight of hemocyte per L of the calcium source-containing solution, and is then reacted with carbon dioxide.

The extrapallial fluid is introduced into the reactor in an amount of 0.01~1 g wet weight of extrapallial fluid per L of the calcium source-containing solution, and is then reacted with carbon dioxide.

The carbon dioxide included in the gas mixture is converted into bicarbonate ions by the hemocyte or extrapallial fluid, and the bicarbonate ions are precipitated into stable calcium carbonate while reacting with calcium ions, by which the carbon dioxide is separated from the gas mixture.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
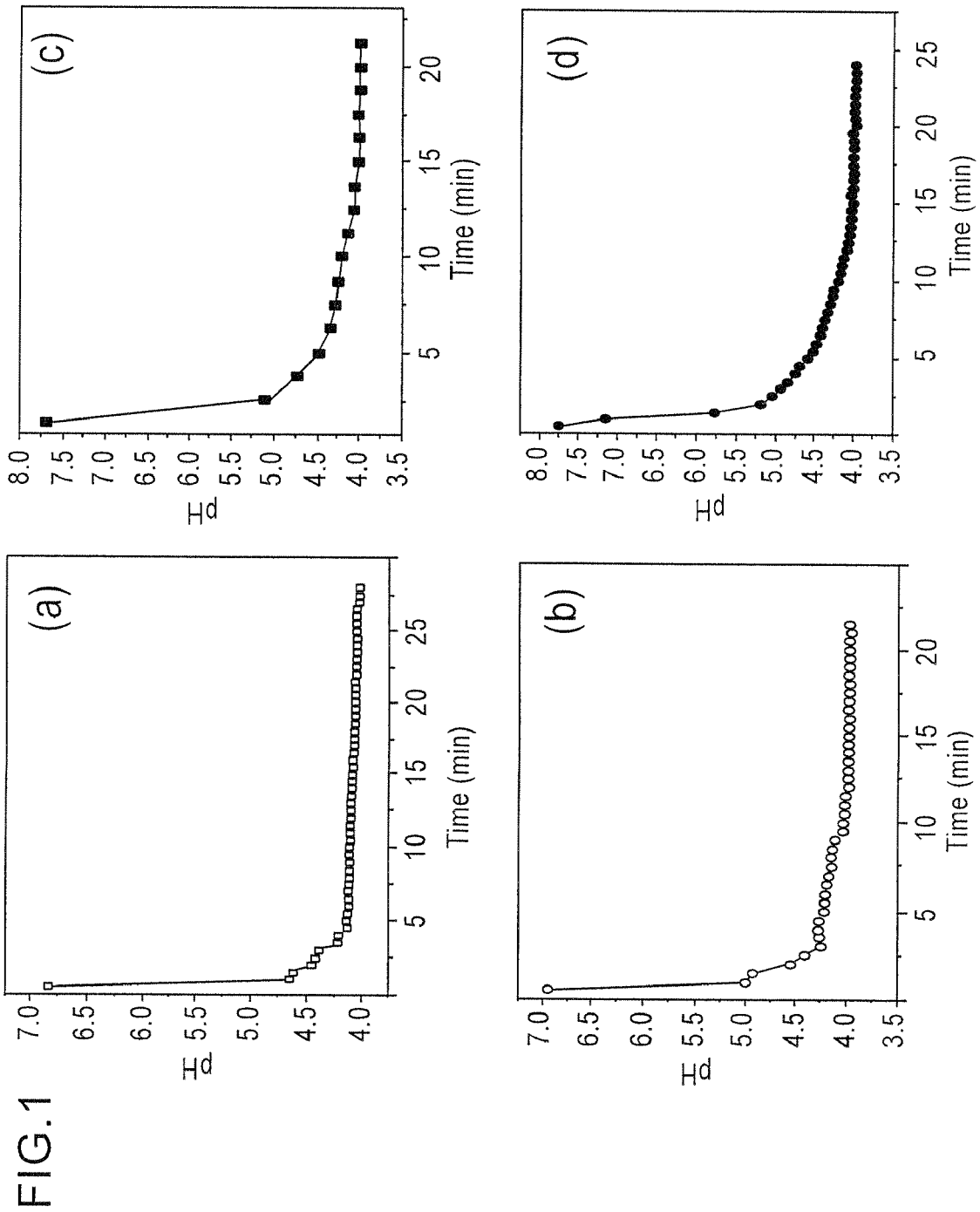
FIGS. 1(a) and 1(b) are graphs showing the carbon dioxide treatment capacities of bovine carbonic anhydrase II when the amounts thereof are 1 g and 0.2 g, respectively.
FIGS. 1(c) and 1(d) are graphs showing the carbon dioxide treatment capacities of hemocyte when the amounts thereof are 1 g and 0.2 g, respectively.

Hereinafter, the present invention will be described in detail.

Generally, the procedure of forming inorganic materials, when conducted by living organisms, is referred to as "biomineralization". Biomaterials, which are formed through the biomineralization, chiefly function as supports (for example, bone), protectants (for example, shells), sensors (for example, bacterial magnetite), pulverizers, crushers (for example, teeth), and the like. Among them, shells are composed of calcium carbonate, and Bivalves synthesize shells using carbon dioxide and calcium ions present in sea water. The hemocyte or extrapallial fluid, which is used in the present invention, is a biopolymer playing an important role in the synthesis of shells. Here, the hemocyte which is extracted from *Crassostrea gigas* is a water-soluble protein including 50% or more of a granulocyte having a molecular weight of 20~50 kDa, and the extrapallial fluid which is extracted from *Crassostrea gigas* is a biopolymer including glycoprotein having a molecular weight of 20~80 kDa and organic acid.

Therefore, the hemocyte or extrapallial fluid used in the present invention is advantageous in that it can be produced in large quantities, can be simply refined, and can be easily reproduced compared to conventional carbonic anhydrase. When carbon dioxide is treated using such hemocyte or extrapallial fluid, highly pure carbon dioxide can be obtained from a gas mixture.

Specifically, the present invention provides a method of separating carbon dioxide from a gas mixture by reacting a gas mixture including carbon dioxide with a calcium source using the hemocyte or extrapallial fluid, which is a biopolymer extracted from shells.

In the method, the carbon dioxide included in the gas mixture is converted into bicarbonate ions by the hemocyte or extrapallial fluid, and the bicarbonate ions are precipitated into stable calcium carbonate while reacting with calcium ions, thereby separating the carbon dioxide from the gas mixture.

The reactor of the present invention is selected from among a wet reactor charged with filling materials, a separation membrane reactor and a gas-liquid contact membrane reactor. In the reactor, a biopolymer is used in a state in which it is supported on a filling material, a separation membrane, or the like.

The reaction temperature in the reactor is maintained at a temperature of 30~50° C. The hemocyte and extrapallial fluid, which are used in the present invention, are extracted from *Crassostrea gigas*. Since hemocyte or extrapallial fluid has the greatest activity at temperatures near the temperature of sea water, the experiment was conducted at a temperature of 30° C. Moreover, since the ability of hemocyte or extrapallial fluid to activate carbon dioxide can be decreased at temperatures of 50° C. or higher due to the protein denaturation in the hemocyte or extrapallial fluid, in order to evaluate this, the experiment was conducted at a temperature of 30~50° C.

In the experiment, hemocyte was introduced into the reactor at a feed rate of 0.01~1 g by dry weight of hemocyte per L of a calcium source-containing solution, and was then reacted with carbon dioxide. Here, the reason why the feed rate of hemocyte is limited as set forth above is that when the amount of hemocyte is less than 0.01 g, unreacted carbon dioxide is increased, and when the amount of hemocyte is greater than 1 g, process costs are increased.

Further, in the experiment, extrapallial fluid is introduced into the reactor at a feed rate of 0.01~1 g wet weight of extrapallial fluid per L of a calcium source-containing solution, and is then reacted with carbon dioxide. Here, the reason why the feed rate of the extrapallial fluid is limited as set forth above is that when the amount of extrapallial fluid is less than 0.01 g, unreacted carbon dioxide is increased, and when the amount of extrapallial fluid is more than 1 g, process costs are increased.

Hereinafter, Examples of the present invention will be described in more detail with reference to the attached drawings. In the description of the present invention, when it is determined that the scope and features of the present invention are unnecessarily obscured by the detailed description of commonly known functions and constitutions relating to the present invention, the detailed description of these commonly known functions and constitutions will be omitted.

As calcium sources of the present invention, calcium ions extracted from blast-furnace slag or steel-making slag including about 40% or more of calcium oxide (CaO), and calcium ions obtained using calcium chloride ($CaCl_2$) were used. In the experiment, it was observed that the two calcium sources showed the same results. Here, only the experimental result observed using the calcium ions obtained from calcium chloride ($CaCl_2$) is described, but the present invention is not limited thereto.

Further, as carbonic anhydrase for comparison with the biopolymer, bovine carbonic anhydrase II (Sigma) was used.

Further, secondary distilled water was used as water for the reaction, and the total amount of the solution was based on 1 L thereof.

That is, 0.2~1 g by dry weight of hemocyte was added to 1 L of a calcium chloride solution, which was obtained by dissolving 0.2~1.0 mole of calcium chloride ($CaCl_2$), which is a calcium source, in 1 L of secondary distilled water, was dissolved therein, and was then reacted with carbon dioxide. Further, 0.2~1 g by wet weight of extrapallial fluid was added to the calcium chloride solution, was dissolved therein, and was then reacted with carbon dioxide.

The hemocyte and extrapallial fluid, used in the present invention, were extracted from *Crassostrea gigas* cultured along the coast of Korea, refined, and then used. As to the amounts of biopolymers that can be extracted from 25 g of *Crassostrea gigas*, while the amount of the extracted carbonic anhydrase is about 0.00001 g by dry weight, the amount of the extracted hemocyte is about 1 g by dry weight, and the amount of the extracted extrapallial fluid is about 10 g by wet weight. From this, it can be seen that the amount of the extracted hemocyte is 100,000 times the amount of the extracted carbonic anhydrase, and the amount of the extracted extrapallial fluid is 1,000,000 times the amount of the extracted carbonic anhydrase. Therefore, it can be seen that hemocyte and extrapallial fluid are more economical than carbonic anhydrase.

Hereinafter, hemocyte and extrapallial fluid, which are biopolymers of the present invention, will be compared with bovine carbonic anhydrase II, which is a comparative material, through the following Example.

EXAMPLE

Carbon Dioxide Treatment Capacity of Hemocyte

FIG. 1 shows the carbon dioxide treatment capacities of bovine carbonic anhydrase II and hemocyte at a predetermined temperature (30° C.). Carbon dioxide included in a gas mixture was introduced into a reactor, and was then reacted with a biopolymer, and was thus formed into bicarbonate ions. In this case, the pH of the solution in the reactor was decreased. From this, it was found that carbon dioxide was absorbed in the biopolymer and carbon dioxide was converted.

As shown in FIGS. 1(a) and 1(b), when 1 g and 0.2 g of bovine carbonic anhydrase II, which was used as a material for comparison, were used, the pH values of the solution in the reactor were decreased by about 3.0 and 3.2, respectively. In contrast, as shown in FIGS. 1(c) and 1(d), when 1 g and 0.2 g of hemocyte were used, the pH values of the solution in the reactor were decreased by about 3.7 and 3.8, respectively.

Therefore, from FIG. 1, it was found that the carbon dioxide adsorption capacity of bovine carbonic anhydrase II was similar to that of hemocyte.

This experiment was conducted under the conditions given in Table 1 below.

TABLE 1

| Condition | Value |
| --- | --- |
| Concentration of calcium ion | 0.1~1 (M) |
| Temperature | 30~50° C. |
| Flow rate of carbon oxide | 50 ml/min |
| Amount of biopolymer | 0.01~1 g |

Figure 2:
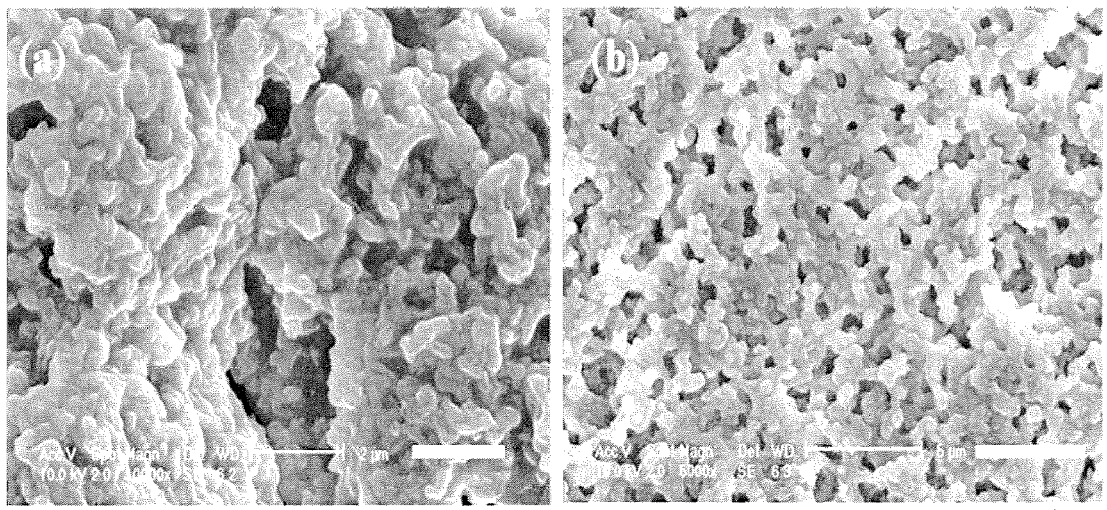
FIG. 2(a) is a SEM (scanning electron microscope) photograph (scale bar 2 μm) showing the surface shape of the precipitate formed by treating carbon dioxide using the bovine carbonic anhydrase II in FIG. 1A.
FIG. 2(b) is a SEM (scanning electron microscope) photograph (scale bar 5 μm) showing the surface shape of the precipitate formed by treating carbon dioxide using the hemocyte in FIG. 1C.
FIG. 2(C) is a table showing the results of analysis of the surfaces of the precipitates using an energy dispersive spectrometer.

FIG. 2(a) is a SEM (scanning electron microscope) photograph (scale bar 2 μm) showing the surface shape of the precipitate formed by treating carbon dioxide using the bovine carbonic anhydrase II in FIG. 1(a), FIG. 2(b) is a SEM (scanning electron microscope) photograph (scale bar 5 μm) showing the surface shape of the precipitate formed by treating carbon dioxide using the hemocyte in FIG. 1(c), and FIG. 2(c) is a table showing the results of analysis of the surfaces of the precipitates using an energy dispersive spectrometer.

As shown in FIGS. 2(a), 2(b) and 2(c), the precipitate includes particles having a particle size of about 1 μm and shows a uniform shape. The precipitate can be used for building materials, materials for road pavement, and raw materials for paper manufacture. Further, since the precipitate stores carbon dioxide in the form of stable minerals, an additional carbon dioxide storage space, such as an underground carbon dioxide storage space or a carbon dioxide storage space at sea, is not required.

As shown in FIGS. 2(a), 2(b) and 2(c), the precipitate includes particles having a particle size of about 1□, and shows a uniform shape. The precipitate can be used for building materials, materials for road pavement, and raw materials for paper manufacture. Further, since the precipitate stores carbon dioxide in the form of stable minerals, an additional carbon dioxide storage space, such as an underground carbon dioxide storage space or a carbon dioxide storage space at sea, is not required.

Furthermore, in the present invention, the carbon dioxide discharged from large-sized carbon dioxide discharge sources, such as coal thermoelectric power plants, steel plants, cement factories, chemical plants, and the like, the carbon dioxide present in living facilities, such as schools, offices, apartments, and the like, and the carbon dioxide emitted by moving sources, such as trains, airplanes, submarines, and the like, can be recovered using a biopolymer.

Moreover, the precipitate was analyzed using EDS. As a result, it was found that the precipitate was composed of calcium, carbon, oxygen and chlorine.

In this case, it is determined that the formation of the precipitate was influenced by a predetermined amount of chlorine ions formed by the dissociation of calcium chloride ($CaCl_2$) used as a calcium source.

Carbon Dioxide Treatment Capacity of Extrapallial Fluid

Figure 3:
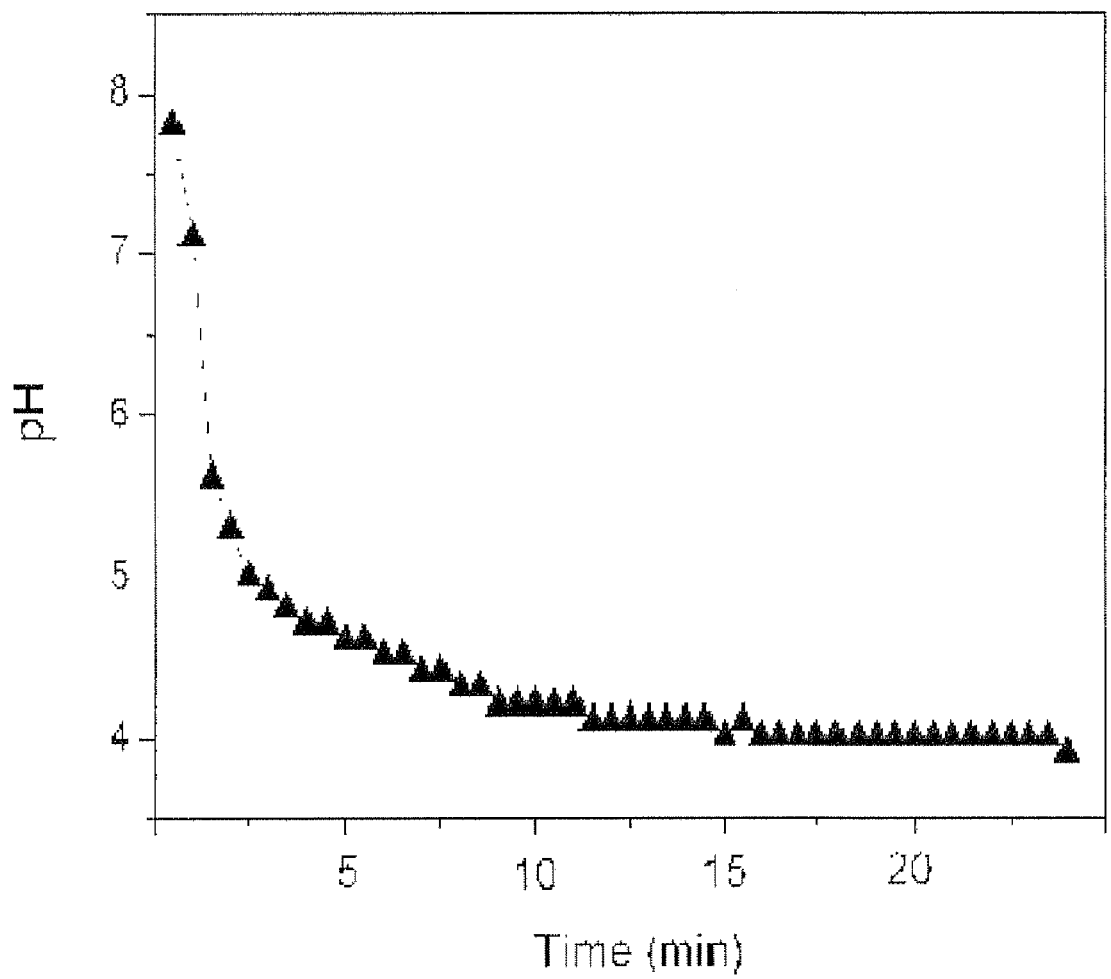
FIG. 3 is a graph showing the result of treating carbon dioxide using 1 g of extrapallial fluid at a temperature of 30° C.

FIG. 3 shows the carbon dioxide treatment capacity of extrapallial fluid at a predetermined temperature (30° C.).

As shown in FIG. 3, when 1 g by wet weight of extrapallial fluid was used, the pH value of the solution in the reactor was decreased by about 3.9. From this, it can be seen that the extrapallial fluid has the ability to hydrate carbon dioxide, and the extrapallial fluid can be used in a carbon dioxide treatment and separation process together with bovine carbonic anhydrase II and hemocyte.

Figure 4:
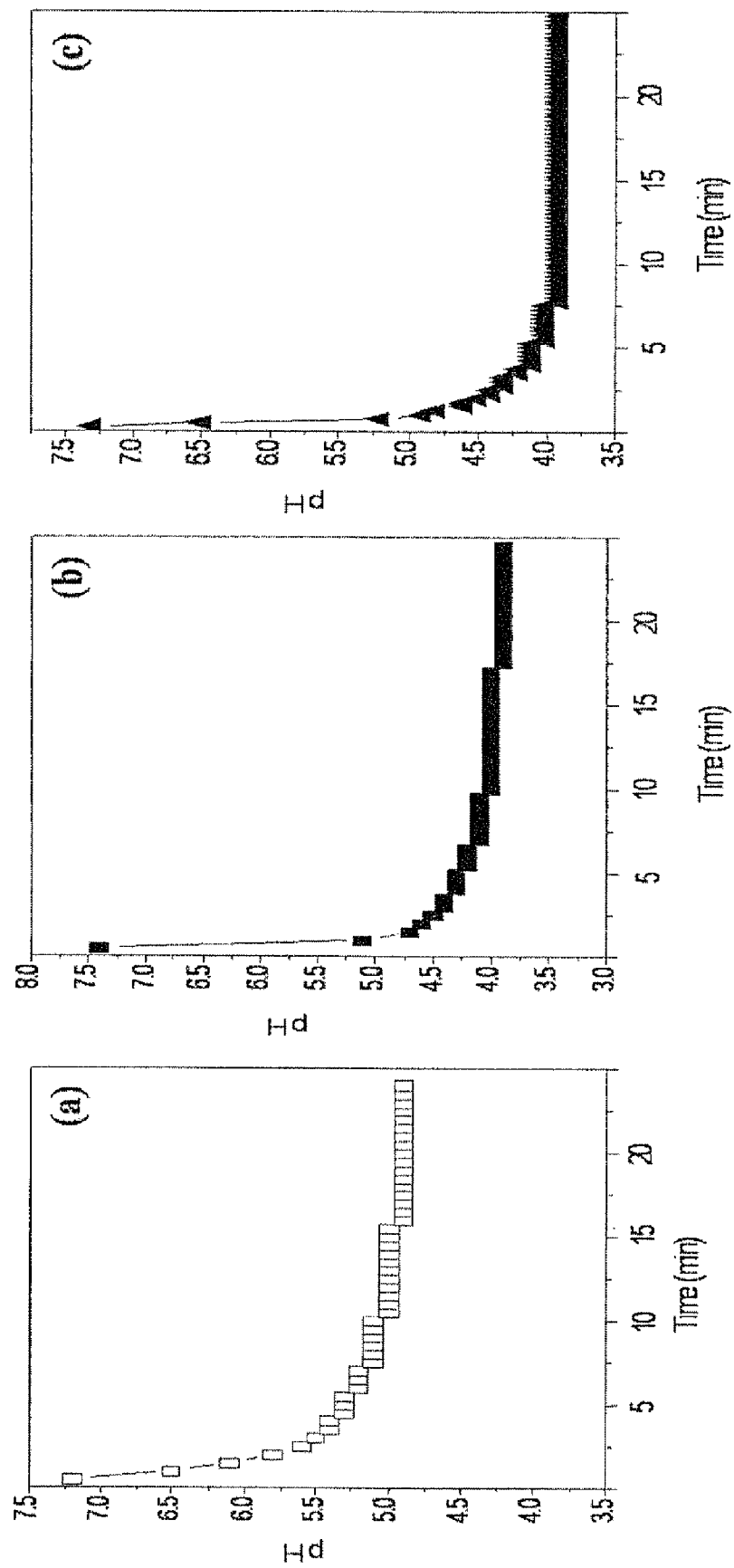
FIGS. 4(a), 4(b) and 4(c) are graphs showing the carbon dioxide treatment capacities of bovine carbonic anhydrase II, hemocyte and extrapallial fluid, respectively, at a constant temperature of 50☐.

FIGS. 4(a), 4(b) and 4(c) are graphs showing the carbon dioxide treatment capacities of bovine carbonic anhydrase II, hemocyte and extrapallial fluid, respectively, at a constant temperature of 50° C.

As shown in FIG. 4(a), when bovine carbonic anhydrase II was used, the pH value of the solution in the reactor was decreased by about 2.5. In contrast, as shown in FIGS. 4(b) and 4(c), when hemocyte and extrapallial fluid were used, the pH values of the solution in the reactor were all decreased by about 3.5. Further, the carbon dioxide treatment efficiency and reaction rate (gradient in pH variation) of bovine carbonic anhydrase II when the bovine carbonic anhydrase II was used at a temperature of 50° C. were decreased by about 7% compared to when bovine carbonic anhydrase II was used at a temperature of 30° C., but hemocyte and extrapallial fluid were not influenced by temperature. Therefore, biopolymers having thermal stability are required, considering that the temperature of a gas mixture including carbon dioxide, discharged from power generation facilities, is 50~90° C. Accordingly, it is expected that hemocyte and extrapallial fluid can be widely used in the separation and treatment of carbon dioxide.

According to the present invention, carbon dioxide is separated from a gas mixture using a biopolymer, such as hemocyte or extrapallial fluid. Such a biopolymer is an alternative material which can overcome the problem in which the reproduction of carbonic anhydrase is limited, and can be obtained from the body tissues of oysters (*Crassostrea gigas*) in large quantities. When this biopolymer is used, the amount of carbon dioxide that can be separated from a gas mixture is 100 times or more than when carbonic anhydrase is used. Therefore, the present invention is advantageous in that such hemocyte or extrapallial fluid is used as a carbon dioxide absorber, so that processes are simplified, thereby decreasing the consumption of energy, and in that it can be directly applied to small-scale processes as well as large-scale processes for discharging carbon dioxide.

The calcium carbonate synthesized through the present invention can be used for building materials, materials for road pavement, and raw materials for paper manufacture. Further, the present invention is advantageous in that, since the calcium carbonate stores carbon dioxide in the form of thermodynamically stable minerals, an additional carbon dioxide storage space, such as an underground carbon dioxide storage space or a carbon dioxide storage space at sea, is not required.

Furthermore, the present invention is advantageous in that the carbon dioxide discharged from large-sized carbon dioxide discharge sources, such as coal thermoelectric power plants, steel plants, cement factories, chemical plants, and the like, the carbon dioxide present in living facilities, such as schools, offices, apartments, and the like, and the carbon dioxide emitted by moving sources, such as trains, airplanes, submarines, and the like, can be recovered using a biopolymer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of separating carbon dioxide from a gas mixture using a biopolymer, comprising:
    introducing hemocyte or extrapallial fluid, extracted from a shell, into a reactor filled with a solution containing a calcium source, and then dissolving the hemocyte or extrapallial fluid in the solution to form a mixed solution; and
    mixing carbon dioxide or a gas mixture containing carbon dioxide into the mixed solution to separate carbon dioxide from the gas mixture.

2. The method of separating carbon dioxide from a gas mixture using a biopolymer according to claim 1, wherein the calcium source is one selected from among calcium ions extracted from blast-furnace slag or steel-making slag including a large amount of calcium oxide (CaO), and calcium ions obtained using calcium chloride ($CaCl_2$).

3. The method of separating carbon dioxide from a gas mixture using a biopolymer according to claim 1, wherein the reactor, into which the biopolymer is introduced, is one selected from among a wet reactor charged with filling materials, a separation membrane reactor and a gas-liquid contact membrane reactor, and the biopolymer is used in a state in which it is supported on the filling materials or separation membrane.

4. The method of separating carbon dioxide from a gas mixture using a biopolymer according to claim 1 or 3, wherein a temperature in the reactor is maintained at a temperature of 30° C.~50° C.

5. The method of separating carbon dioxide from a gas mixture using a biopolymer according to claim 1, wherein the hemocyte is introduced into the reactor in an amount of 0.01~1 g by dry weight of hemocyte per L of the calcium source-containing solution, and is then reacted with carbon dioxide.

6. The method of separating carbon dioxide from a gas mixture using a biopolymer according to claim 1, wherein the extrapallial fluid is introduced into the reactor in an amount of 0.01~1 g wet weight of extrapallial fluid per L of the calcium source-containing solution, and is then reacted with carbon dioxide.

7. The method of separating carbon dioxide from a gas mixture using a biopolymer according to claim 1, wherein the carbon dioxide included in the gas mixture is converted into bicarbonate ions by the hemocyte or extrapallial fluid, and the bicarbonate ions are precipitated into stable calcium carbonate while reacting with calcium ions, thereby separating the carbon dioxide from the gas mixture.

8. The method of separating carbon dioxide from a gas mixture using a biopolymer according to claim 1, wherein the reactor is filled with 1 L of a solution containing a calcium source.

* * * * *